United States Patent
Du et al.

(10) Patent No.: US 12,395,710 B2
(45) Date of Patent: Aug. 19, 2025

(54) METHOD AND APPARATUS FOR GENERATING MUSIC POSTER, ELECTRONIC DEVICE, AND MEDIUM

(71) Applicant: BEIJING ZITIAO NETWORK TECHNOLOGY CO., LTD., Beijing (CN)

(72) Inventors: Yaxuan Du, Beijing (CN); Sen Zhao, Beijing (CN); Xiaojing Chang, Beijing (CN); Jia Qu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 91 days.

(21) Appl. No.: 17/442,480

(22) PCT Filed: Jun. 18, 2021

(86) PCT No.: PCT/CN2021/100854
§ 371 (c)(1),
(2) Date: Sep. 23, 2021

(87) PCT Pub. No.: WO2022/057348
PCT Pub. Date: Mar. 24, 2022

(65) Prior Publication Data
US 2022/0353587 A1    Nov. 3, 2022

(30) Foreign Application Priority Data
Sep. 15, 2020 (CN) .......................... 202010968493.3

(51) Int. Cl.
*H04N 21/81* (2011.01)
*G11B 27/02* (2006.01)
(52) U.S. Cl.
CPC ......... *H04N 21/8146* (2013.01); *G11B 27/02* (2013.01)

(58) Field of Classification Search
None
See application file for complete search history.

(56) References Cited

U.S. PATENT DOCUMENTS

| 2008/0052371 A1 | 2/2008 | Partovi et al. |
| 2014/0205261 A1* | 7/2014 | Courtemanche ..... G11B 27/031 386/224 |

(Continued)

FOREIGN PATENT DOCUMENTS

| CN | 102609899 A | 7/2012 |
| CN | 103793446 A | 5/2014 |

(Continued)

OTHER PUBLICATIONS

Chinese Patent Application No. 202010968493.3, First Office Action and Search mailed Apr. 22, 2021, 12 pages with English Translation.

(Continued)

*Primary Examiner* — Gelek W Topgyal

(57) ABSTRACT

Embodiments of the present disclosure provide a method and apparatus for generating a music poster, an electronic device, and a medium. The method includes: obtaining basic information of target music and lyric information of the target music, in response to a music poster generation instruction for the target music; generating a first video having a special effect based on the basic information of the target music; generating a second video based on the lyric information of the target music; and merging the first video with the second video to obtain the music poster of the target music. The embodiments of the present disclosure can achieve the visual appeal of the music poster while highlighting the basic information of a song, thereby enhancing the user's perception of the whole song and improving the user experience.

8 Claims, 3 Drawing Sheets

(56) References Cited

U.S. PATENT DOCUMENTS

2019/0182552 A1* 6/2019 Johnsen .............. G06F 3/04883
2020/0233574 A1* 7/2020 Okafor ................ H04L 51/52

FOREIGN PATENT DOCUMENTS

| CN | 104882151 A | * | 9/2015 |
|---|---|---|---|
| CN | 106598996 A | | 4/2017 |
| CN | 109756783 A | | 5/2019 |
| CN | 110213504 A | | 9/2019 |
| CN | 111447489 A | | 7/2020 |
| CN | 112069360 A | | 12/2020 |
| IN | 552934 | | 10/2024 |

OTHER PUBLICATIONS

Chinese Patent Application No. 202010968493.3, Second Office Action and Supplemental Search mailed Jul. 14, 2021, 15 pages with English Translation.
QQ Music (2018) "How does QQ Music make a video poster (lyric poster)?" [online] Accessed on Sep. 18, 2021 website: https://jingyan.baidu.com/article/ed15cb1 b9061 a41 be369813b.html.
Rejection Decision issued Feb. 23, 2022 in Chinese Patent Application No. 202010968493.3 (4 pages) with English translation (6 pages).
International Patent Application No. PCT/CN2021/100854, International Search Report mailed Sep. 22, 2021, 5 pages.
"How does QQ Music make a video poster (lyric paster)?" (2017) [online] Accessed on: Sep. 18, 2021, website: https://iingyan.baidu.com/article/ed15cb1b9061a41be369813b.html.
Chinese Patent Application No. 202010968493.3, Third Office Action and Supplemental Search mailed Nov. 18, 2021, 28 pages with English Translation.
Wei, Chao (2013) "Part I: Research on search engine and player products" Classification Research on Digital Audio-Visual Industry in China, pp. 19.
Sheji et al. (2017) "Chapter 4 Video Production of Micro-course Teaching Design" Live-action micro-course video production.
Office action received from Indian patent application No. 202127043114 mailed on Jan. 24, 2024, 7 pages.
International Search Report for International Application No. PCT/CN2021/117199, mailed Dec. 17, 2021, 5 pages.
Written Opinion for International Application No. PCT/CN2021/100854, mailed Sep. 22, 2021, 5 Pages.
Notification of Advanced Stage Substantive Examination Results issued in ID No. HKI-3-KITL-P00202107961 on Jun. 23, 2025, English Translation; 6 pages.

* cited by examiner

METHOD AND APPARATUS FOR GENERATING MUSIC POSTER, ELECTRONIC DEVICE, AND MEDIUM

The present application is a U.S. 371 Application of International Patent Application No. PCT/CN2021/100854, filed on 18 Jun. 2021, which application claims a priority to the Chinese Patent Application No. 202010968493.3, titled "METHOD AND APPARATUS FOR GENERATING MUSIC POSTER, ELECTRONIC DEVICE, AND MEDIUM" filed with the China National Intellectual Property Administration on Sep. 15, 2020, the entire contents of which are hereby incorporated by reference.

FIELD

The present disclosure relates to the field of communication technologies, and particularly, to a method and apparatus for generating a music poster, an electronic device, and a medium.

BACKGROUND

With the rise of the mobile Internet and the development of communication technologies, applications are increasingly diversified. These various applications enrich the multiple aspects in life, study, entertainment and other aspects of users. With the development of music applications, in addition to enjoying the music, the users can also make music posters to share music.

When making a music poster to share music, a user can select a target poster background from a number of poster backgrounds, and select lyric information to be shared from lyric information of the music. A music application can simply superimpose the lyric information to be shared on the target poster background to obtain a music poster. Specifically, the target poster background includes at least one image. For each image, a part or all of the lyric information to be shared can be added at a predetermined position of the image to obtain the music poster.

In the above method for generating the music poster, since the lyric information is simply superimposed onto the poster background, the generated music poster is unattractive, and thus user experience is poor.

SUMMARY

The present disclosure provides a method and apparatus for generating a music poster, an electronic device, and a medium, capable of enhancing visual appeal of the music poster, thereby improving user experience.

In a first aspect, provided is a method for generating a music poster. The method includes: obtaining basic information of target music and lyric information of the target music, in response to a music poster generation instruction for the target music; generating a first video having a special effect based on the basic information of the target music; generating a second video based on the lyric information of the target music; and merging the first video with the second video to obtain the music poster of the target music.

In a second aspect, provided is an apparatus for generating a music poster. The apparatus includes: an obtaining module configured to obtain basic information of target music and lyric information of the target music, in response to a music poster generation instruction for the target music; a first generation module configured to generate a first video having a special effect based on the basic information of the target music; a second generation module configured to generate a second video based on the lyric information of the target music; and a merging module configured to merge the first video with the second video to obtain the music poster of the target music.

In a third aspect, an electronic device is provided. The electronic device includes one or more processors, a memory, and one or more applications. The one or more applications are stored in the memory and configured to be executed by the one or more processors to perform operations corresponding to the method for generating the music poster as described in the first aspect.

In a fourth aspect, a computer-readable medium is provided. The computer-readable medium has a computer program stored thereon. The computer program, when executed by a processor, performs the method for generating the music poster as described in the first aspect.

Technical solutions of the present disclosure can provide the following advantageous effects.

The present disclosure provides a method and apparatus for generating a music poster, an electronic device, and a medium. Compared with the prior art, in the present disclosure, the basic information of the target music and the lyric information of the target music are obtained in response to the music poster generation instruction for the target music; the first video having the special effect is generated based on the basic information of the target music, the second video is generated based on the lyric information of the target music, and then the first video is merged with the second video to obtain the music poster of the target music. In this way, the music poster contains both the basic information of the target music and the lyric information of the target music, and a part containing the basic information of the target music has the special effect. Therefore, the music poster has visual appeal and the basic information of a song is highlighted at the same time, thereby enhancing the user's perception of the whole song and improving the user experience.

BRIEF DESCRIPTION OF DRAWINGS

The above and other features, advantages, and aspects of embodiments of the present disclosure will become more apparent with reference to the following detailed description in conjunction with the accompanying drawings. Throughout the drawings, same or similar reference signs represent same or similar elements. It should be understood that the drawings are illustrative, and elements and components are not necessarily drawn to scale.

DESCRIPTION OF EMBODIMENTS

Figure 1:
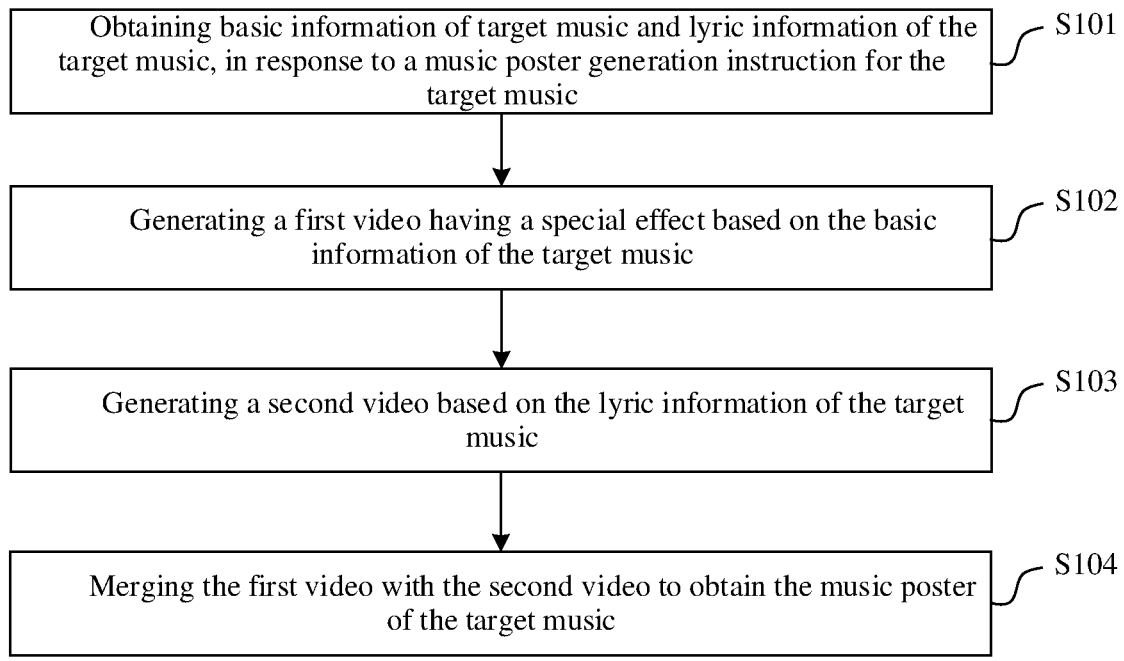
FIG. 1 is a flowchart illustrating a method for generating a music poster according to an embodiment of the present disclosure.

Embodiments of the present disclosure will be described in detail below with reference to the accompanying drawings. While some embodiments of the present disclosure are illustrated in the drawings, it should be understood that the present disclosure may be embodied in various forms and should not be construed as being limited to the embodiments set forth herein. Instead, these embodiments are provided for a complete and thorough understanding of the present disclosure. It should be understood that the drawings and the embodiments of the present disclosure are for illustration purposes only and are not intended to limit the scope of the present disclosure.

It should be understood that respective steps recited in embodiments of the method of the present disclosure may be performed in a different order, and/or performed in parallel. Moreover, the embodiments of the method may include additional steps and/or omit performing the illustrated steps. The scope of the present disclosure is not limited in this respect.

The term "including" and variations thereof as used herein are open-ended, i.e., "including, but not limited to". The term "based on" means "based at least in part on". The term "one embodiment" means "at least one embodiment"; the term "another embodiment" means "at least one additional embodiment"; and the term "some embodiments" means "at least some embodiments". Relevant definitions for other terms will be given in the following description.

It should be noted that terms "first", "second", and the like in the present disclosure are only used for distinguishing different apparatuses, modules, or units, and are not used for limiting an order or interdependence of functions performed by the apparatuses, modules, or units.

It should be noted that terms "a", "an", or "plurality of" in the present disclosure are illustrative rather than limiting, which shall be construed as "one or more" by those skilled in the art, unless clearly indicated otherwise.

The names of messages or information exchanged between apparatuses in the embodiments of the present disclosure are for illustrative purposes only, and are not intended to limit the scope of the messages or information.

The following describes the technical solutions of the present disclosure and the way to solve the above technical problems in detail with specific embodiments. These specific embodiments may be combined with each other below, and details of the same or similar concepts or processes may not be elaborated in some embodiments. The embodiments of the present disclosure will be described below with reference to the accompanying drawings.

An embodiment of the present disclosure provides a method for generating a music poster, which can be executed by an electronic device. The electronic device can be a terminal device such as a mobile phone, a laptop, a tablet computer, a desktop computer, etc., or the electronic device can be a server. A music application is pre-installed on the electronic device. As illustrated in FIG. 1, the method includes step S101 to step S104.

In step S101, basic information of target music and lyric information of the target music are obtained in response to a music poster generation instruction for the target music.

In an embodiment of the present disclosure, a user can trigger the music poster generation instruction for the target music on a display interface of a music application, and the music application can respond to the music poster generation instruction. A manner for triggering the music poster generation instruction is not limited, and it can be, for example, a click operation, a long-press operation, a voice instruction, and the like.

The basic information of the target music includes at least one of a singer's name, a song name, an album name, a lyricist, a composer, an arranger, a release date, a language type, a song genre, and a lyric keyword. Of course, in actual applications, other information may also be included, e.g., the ranking of the target music on a chart, etc., which is not limited in the present disclosure.

The lyric information of the target music can be information of all lyrics of the target music, or information of a part of the lyrics of the target music. For example, when the user performs a selection operation on the lyrics of the target music, the lyrics selected by the user can be used as the lyric information of the target music.

In step S102, a first video having a special effect is generated based on the basic information of the target music.

In an embodiment of the present disclosure, a time length of the first video is not limited and can be set arbitrarily as needed. For example, the time length of the first video can be between 1 to 5.

In step S103, a second video is generated based on the lyric information of the target music.

In an embodiment of the present disclosure, a time length of the second video is also not limited and can be set arbitrarily as needed. For example, the time length of the second video can be a time length corresponding to the lyric information selected by the user.

In step S104, the first video is merged with the second video to obtain the music poster of the target music.

In an embodiment of the present disclosure, when merging the first video with the second video, the first video may follow or precede the second video to obtain the music poster of the target music.

In order to highlight the user's perception of the whole song when watching the music poster, the second video may follow the first video. In this way, when the user is watching the music poster, the user can first watch the first video containing the basic information of the target music, which highlights the user's perception of the target music, and then watch the second video containing the lyric information of the target music, which helps the user understand the target music.

The method for generating the music poster is provided according to the embodiments of the present disclosure. Compared with the prior art, in the embodiments of the present disclosure, the basic information of the target music and the lyric information of the target music are obtained in response to the music poster generation instruction for the target music; the first video having the special effect is generated based on the basic information of the target music, the second video is generated based on the lyric information of the target music, and then the first video is merged with the second video to obtain the music poster of the target music. In this way, the music poster contains both the basic information of the target music and the lyric information of the target music, and a part containing the basic information of the target music has the special effect. Therefore, the music poster has visual appeal and the basic information of a song is highlighted at the same time, thereby enhancing the user's perception of the whole song and improving the user experience.

In another possible implementation of an embodiment of the present disclosure, step S102 of generating the first video having the special effect based on the basic information of the target music may specifically include step S1021 and step S1022.

In step S1021, a mask effect is applied to a first poster background of the music poster to form an initial mask animation.

The music application may obtain at least one poster background, and determine the first poster background based on a selection operation performed by the user on the at least one poster background. It should be noted that any poster background can be a poster background related to the target music, or a poster background uploaded by the user.

For example, if a singer of the target music is named XX and the song genre of the target music is classical music, the at least one poster background may include any one of XX's concert video, XX's poster picture, an ancient video, and an ancient picture.

In an embodiment of the present disclosure, the first poster background having the mask effect can be formed by applying the mask effect to the first poster background of the music poster, i.e., applying a special effect layer to a layer of the first poster background. The first poster background having the mask effect can be present in a form of animation, i.e., the initial mask animation.

In step S1022, the basic information of the target music is merged with the initial mask animation to obtain the first video having the special effect.

In an embodiment of the present disclosure, when the basic information of the target music is merged with the initial mask animation, the basic information of the target music can be added to each frame image of the initial mask animation, and all or a part of the basic information can be added to any frame image of the initial mask animation, which is not limited in the present disclosure.

In another possible implementation of an embodiment of the present disclosure, step S1021 of applying the mask effect to the first poster background of the music poster may specifically include step S10211.

In step S10211, the mask effect is applied to the first poster background of the music poster in a pre-determined sticker sequence. The sticker sequence includes at least one sticker image.

In an embodiment of the present disclosure, the music application can obtain at least one sticker sequence in response to the music poster generation instruction, and determine a target sticker sequence as the pre-determined sticker sequence based on a selection operation performed by the user on the at least one sticker sequence.

In an embodiment of the present disclosure, the sticker sequence includes at least one sticker image. Each sticker image may be a flat graphic (i.e., 2D image). The at least one sticker image is compressed to form one sticker sequence.

Step S10211 of applying the mask effect to the first poster background of the music poster in the pre-determined sticker sequence may specifically include step S102111 to step S102113.

In step S102111, when the first poster background is a picture, the mask effect is applied to the first poster background by using each stick image in the sticker sequence.

In an embodiment of the present disclosure, the first poster background can be a picture, and each sticker image in the sticker sequence can be used to apply the mask effect to the first poster background. That is, each sticker image in the sticker sequence can be superimposed on the first poster background to form the initial mask animation.

In step S102112, when the first poster background is a video, a first number of frame images are selected from the video. The first number is a number of sticker images in the sticker sequence.

In step S102113, the mask effect is applied to the first number of frame images respectively by using the first number of sticker images in the sticker sequence.

In an embodiment of the present disclosure, the first poster background may be a video, and the first number of frame images can be selected from the video. Each sticker image in the sticker sequence is used to apply the mask effect to the first number of frame images. Specifically, each sticker image in the sticker sequence has its corresponding rank. For example, the first sticker image is ranked as the first, and the fifth sticker image is ranked as the fifth. Correspondingly, each frame image of the first number of frame images also has its corresponding rank. Each sticker image can be superimposed on the frame image having the same rank as the sticker image.

For example, the first sticker image in the sticker sequence can be superimposed on the first frame image in the first number of frame images, the second sticker image in the sticker sequence can be superimposed on the second frame image in the first number of frame images, and so on.

In another possible implementation of an embodiment of the present disclosure, step S1022 of merging the basic information of the target music with the initial mask animation may specifically include step S10221.

In step S10221, the basic information of the target music is embedded in a display interface of the initial mask animation based on a predetermined display mode.

The predetermined display mode includes at least one of a display mode of moving along a predetermined trajectory, a display mode of information scrolling, a display mode of a repeated arrangement, a display mode of Gaussian Blur, and a display mode with a dashed line.

In an embodiment of the present disclosure, the basic information of the target music can be embedded in the display interface of the initial mask animation based on the predetermined display mode, or the basic information of the target music can be first added with the special effect, and the basic information added with the special effect can be then embedded in the display interface of the initial mask animation based on the predetermined display mode. Here, applying the special effect to the basic information of the target music can refer to transforming the basic information of the target music into characters in a fancy style, and the like.

In an embodiment of the present disclosure, the display mode of moving along the predetermined trajectory may be a display mode of moving along a square trajectory, a display mode of moving along a circular trajectory, etc., which is not limited in the present disclosure.

When the predetermined trajectory includes corners, e.g., when the predetermined trajectory is a square, a character image of all characters in one line can be generated, where a length of the character image and a width of each character are marked. In order to facilitate the calculation of the length of the character image and the width of each character, a monospaced font can be used to generate one character image of all characters in one line. Further, when the basic information is embedded in the display interface of the initial mask animation, corner positions can be calculated based on requirements of a current display interface, such that the character image can be folded at the corner positions by a predetermined angle. Coordinate positions of two segments of character images can be calculated and rendered to the current display interface.

In an embodiment of the present disclosure, the display mode of Gaussian Blur can be realized by generating a character image of all the characters in one line, and performing a number of times of approximate Gaussian Blur on the character image in a horizontal direction and a vertical direction in a shader. The display mode with the dashed line can be realized by replacing a color of the character image in accordance with time and a coordinate range.

It should be noted that, in addition to the above display modes, the predetermined display mode according to the embodiment of the present disclosure may include other display modes, such as a static display mode, a display mode of entering from one side of a predetermined region and disappearing from the other side of the predetermined region, and the like.

Step S10221 of embedding the basic information of the target music in the display interface of the initial mask animation may specifically include step S102211 and step S102212.

In step S102211, the basic information of the target music is divided into at least two pieces of song sub-information based on contents of the basic information.

In an embodiment of the present disclosure, the basic information of the target music includes at least one of the singer's name, the song name, the album name, the lyricist, the composer, the arranger, the release date, the language type, the song genre, and the lyric keyword. The basic information may be divided into at least two pieces of song sub-information based on the contents of the basic information, and any piece of song sub-information may include at least one item of the above-mentioned basic information.

For example, when the basic information of the target music includes the singer's name, the song name, and the language type, the basic information can be divided into three pieces of song sub-information, i.e., the singer's name, the song name, and the language type; or the basic information can be divided into two pieces of song sub-information, one piece of song sub-information including the singer's name and the song name, and the other piece of song sub-information including the language type.

In step S102212, each of the at least two pieces of song sub-information is embedded in a predetermined position in the display interface of the initial mask animation.

In an embodiment of the present disclosure, each piece of song sub-information, based on the predetermined display mode configured therefor, can be embedded in the predetermined position in the display interface of the initial mask animation. Any two pieces of song sub-information may have the identical to or different predetermined display modes.

Figure 4:
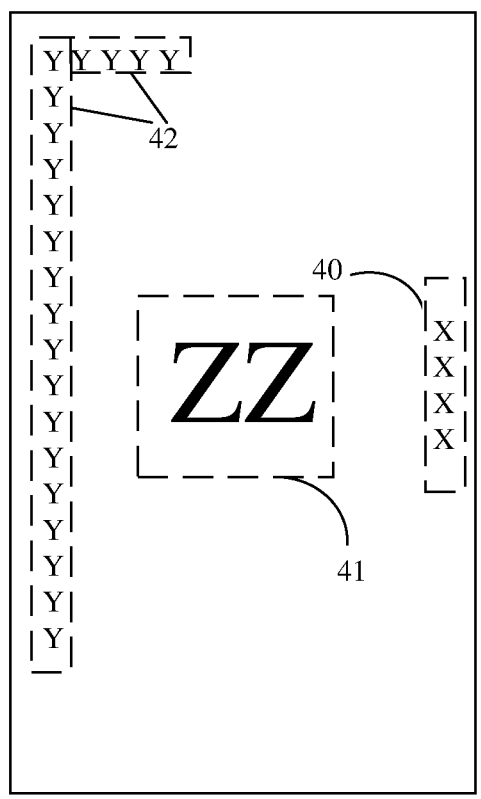
FIG. 4 is a schematic diagram of a display interface of a music poster according to an embodiment of the present disclosure.

For example, as illustrated in FIG. 4, the song sub-information in a region indicated by a reference sign 40 and the song sub-information in a region indicated by a reference sign 42 can be displayed in the same predetermined display mode, i.e., scrolling along an edge of the display interface; the song sub-information in a region indicated by a reference sign 41 and the song sub-information in the regions indicated by the reference signs 40/42 are displayed in different display modes, in which the song sub-information in the region indicated by the reference sign 41 is displayed in a statical mode.

It should be noted that information in the regions indicated by the reference signs 40, 41, and 42 is only illustrative and has no practical meaning.

In another possible implementation of an embodiment of the present disclosure, step S103 of generating the second video based on the lyric information of the target music may specifically include: merging the lyric information of the target music with a second poster background of the music poster to obtain the second video.

The music application can obtain at least one poster background, and determine the second poster background based on a selection operation performed by the user on the at least one poster background. The second poster background may be identical to or different from the first poster background. The second poster background can be a picture or a video.

When the second poster background is a picture, the lyric information can be added to the picture to obtain a lyric poster image or a lyric poster video.

When the second poster background is a video, a second number of frame images can be selected from the video. The second number can be a predetermined number, or a number matching the lyric information. The lyric information may be added to the second number of frame images to obtain the lyric poster video.

In an embodiment of the present disclosure, the lyric poster video is the second video. The music poster can be obtained by putting the second video after the first video. In a possible implementation, when playing the music poster, the first video is played first, such that the user can perceive the song as a whole and obtain the basic information of the song. The important information in the basic information can be placed on a conspicuous position of images of the first video, e.g., the region indicated by the reference sign 41 in FIG. 4. The unimportant information in the basic information can be placed on edges of the first video and scroll along the edges, e.g., regions indicated by the reference signs 40 and 42 in FIG. 4. The sticker sequence in the first video can be a sticker sequence that enlarges the background poster. In this way, in a process of playing the first video, the user is provided with a visual effect that the background poster is continuously zoomed in, thereby achieving an objective of switching to the second video.

The above describes the method for generating the music poster in detail from the perspective of method steps, and an apparatus for generating a music poster is described below from the perspective of virtual modules. Details are as follows.

Figure 2:
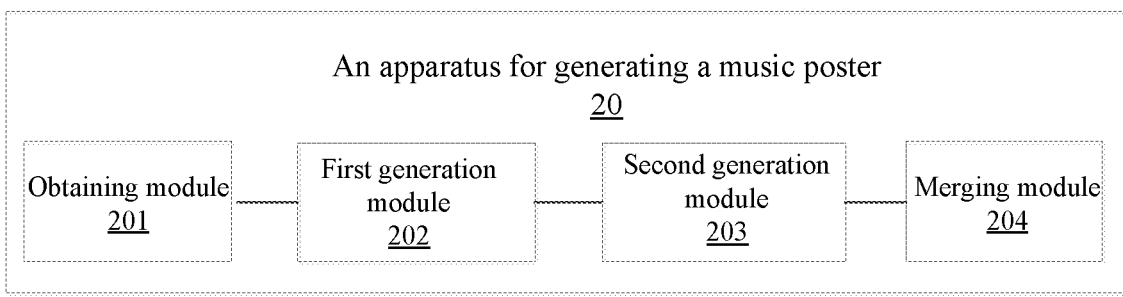
FIG. 2 is a structural schematic diagram of an apparatus for generating a music poster according to an embodiment of the present disclosure.

An embodiment of the present disclosure provides an apparatus for generating a music poster. As illustrated in FIG. 2, the apparatus 20 for generating a music poster may include an obtaining module 201, a first generation module 202, a second generation module 203, and a merging module 204.

The obtaining module 201 is configured to obtain basic information of target music and lyric information of the target music in response to a music poster generation instruction for the target music.

The first generation module 202 is configured to generate a first video having a special effect based on the basic information of the target music.

The second generation module 203 is configured to generate a second video based on the lyric information of the target music.

The merging module 204 is configured to merge the first video with the second video to obtain the music poster of the target music.

In another possible implementation of an embodiment of the present disclosure, the first generation module 202 is specifically configured to: apply a mask effect to a first poster background of the music poster to form an initial mask animation; and merge the basic information of the target music with the initial mask animation to obtain the first video having the special effect.

In another possible implementation of an embodiment of the present disclosure, when applying the mask effect to the first poster background of the music poster, the first generation module 202 is specifically configured to apply the mask effect to the first poster background of the music poster in a pre-determined sticker sequence. The sticker sequence includes at least one sticker image.

In another possible implementation of an embodiment of the present disclosure, when applying the mask effect to the first poster background of the music poster in the pre-determined sticker sequence, the first generation module 202 is specifically configured to: apply the mask effect to the first poster background by using each stick image in the sticker sequence when the first poster background is a picture; select a first number of frame images from the video when the first poster background is a video, in which the first number is a number of sticker images in the sticker sequence, and apply the mask effect to the first number of frame images respectively by using the first number of sticker images in the sticker sequence.

In another possible implementation of an embodiment of the present disclosure, when merging the basic information of the target music with the initial mask animation, the first generation module 202 is specifically configured to embed the basic information of the target music in a display interface of the initial mask animation based on a predetermined display mode. The predetermined display mode includes at least one of a display mode of moving along a predetermined trajectory, a display mode of information scrolling, a display mode of a repeated arrangement, a display mode of Gaussian Blur, and a display mode with a dashed line.

In another possible implementation of an embodiment of the present disclosure, when embedding the basic information of the target music in the display interface of the initial mask animation, the first generation module 202 is specifically configured to: divide the basic information of the target music into at least two pieces of song sub-information based on contents of the basic information; and embed each of the at least two pieces of song sub-information in a predetermined position in the display interface of the initial mask animation.

In another possible implementation of an embodiment of the present disclosure, the basic information of the target music includes at least one of a singer's name, a song name, an album name, a lyricist, a composer, an arranger, a release date, a language type, a song genre, and a lyric keyword.

In another possible implementation of an embodiment of the present disclosure, the second generation module 203 is specifically configured to obtain the second video by merging the lyric information of the target music with a second poster background of the music poster.

The first generation module 202 and the second generation module 203 according to an embodiment of the present disclosure may be one same generation module or two different generation modules, which is not limited in the present disclosure.

The apparatus 20 for generating the music poster according to the embodiment can implement the method for generating the music poster according to the first embodiment of the present disclosure. Implementation principles of the apparatus are similar to those of the method, which are not described in detail herein.

The apparatus for generating the music poster is provided according to an embodiment of the present disclosure. Compared with the prior art, in the embodiment of the present disclosure, the basic information of the target music and the lyric information of the target music are obtained in response to the music poster generation instruction for the target music; the first video having the special effect is generated based on the basic information of the target music, the second video is generated based on the lyric information of the target music; and then the first video is merged with the second video to obtain the music poster of the target music. In this way, the music poster contains both the basic information of the target music and the lyric information of the target music, and a part containing the basic information of the target music has the special effect. Therefore, the music poster has visual appeal and the basic information of a song is highlighted at the same time, thereby enhancing the user's perception of the whole song and improving the user experience.

The above describes the apparatus for generating the music poster of the present disclosure from the perspective of virtual modules, and an electronic device of the present disclosure is described below from the perspective of a physical device.

Figure 3:
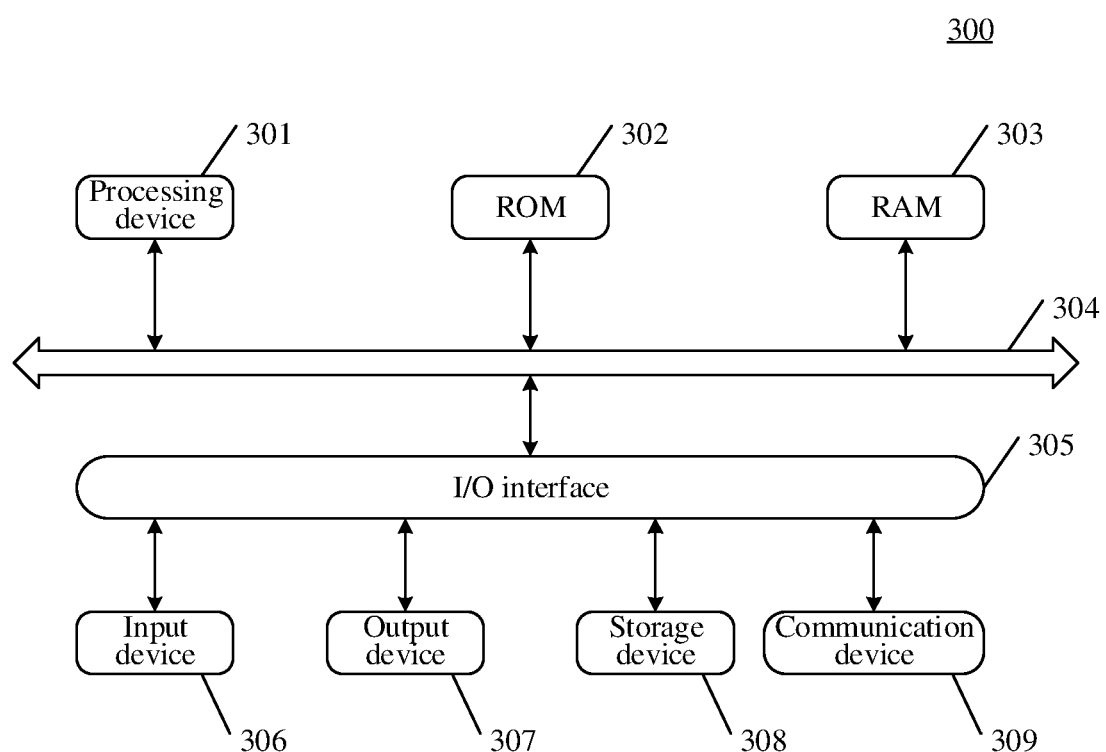
FIG. 3 is a structural schematic diagram of an electronic device according to an embodiment of the present disclosure.

FIG. 3 is a structural schematic diagram of an electronic device 300 (e.g., the terminal device or the server illustrated in FIG. 1) adapted to implement the embodiments of the present disclosure. Referring to FIG. 3, the electronic device 300 may include one or more processors, a memory, and one or more applications. The one or more applications are stored in the memory and configured to be executed by the one or more processors to perform the method for generating the music poster according to the embodiments involving the method.

The terminal device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 3 is exemplary only, and should not be construed as limiting the function and scope of use of the embodiments of the present disclosure.

The electronic device includes a memory and a processor. The processor herein may be referred to as a processing device 301 hereinafter, and the memory may include at least one of a Read Only Memory (ROM) 302, a Random Access Memory (RAM) 303, and a storage device 308, which are described in detail as follows.

As illustrated in FIG. 3, the electronic device 300 may include a processing device 301 (e.g., a central processing unit, a graphics processor, etc.), which may perform various appropriate actions and processes in accordance with programs stored in an ROM 302 or loaded from a storage device 306 into an RAM 303. Various programs and data required for operation of the electronic device 300 may also be stored on the RAM 303. The processing device 301, the ROM 302, and the RAM 303 are connected to each other through a bus 304. An input/output (I/O) interface 305 is also connected to bus 304.

Generally, the following devices may be connected to the I/O interface 305: input devices 306 including, for example, a touch screen, a touch pad, a keyboard, a mouse, a camera, a microphone, an accelerometer, a gyroscope, etc.; an output device 307 including, for example, a Liquid Crystal Display (LCD), a speaker, a vibrator, and the like; a storage device 308 including, for example, magnetic tape, hard disk, etc.; and a communication device 309. The communication device 309 may allow the electronic apparatus 300 to perform wireless or wired communication with other devices for data exchange. Although FIG. 3 illustrates the electronic device 300 having various means, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 309, or installed from the storage device 306, or installed from the ROM 302. When the computer program is executed by the processing device 301, the above-mentioned functions defined in the method for updating the page display according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

In some embodiments, the client and the server may communicate using any currently known or future-developed network protocol, such as HTTP (HyperText Transfer Protocol), and may be in communication interconnection with digital data in any form or medium (e.g., a communication network). Examples of communication networks include a Local Area Network ("LAN"), a Wide Area Network ("WAN"), the Internet work (e.g., the Internet), and an end-to-end network (e.g., ad hoc end-to-end network), as well as any currently known or future-developed network.

The above-mentioned computer readable medium may be contained in the above-mentioned electronic device, or it may be separated and not assembled into the electronic device.

The above-mentioned computer readable medium carries one or more programs which, when executed by the electronic device, cause the electronic device to: obtain basic information of target music and lyric information of the target music, in response to a music poster generation instruction for the target music; generate a first video having a special effect based on the basic information of the target music; generate a second video based on the lyric information of the target music; and merge the first video with the second video to obtain the music poster of the target music.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, the functions showed in blocks may occur in an order other than the order illustrated in the drawings. For example, two blocks illustrated in succession may actually be executed substantially in parallel with each other, or sometimes even in a reverse order, depending on functions involved. It should also be noted that each block in the block diagrams and/or flowcharts, or any combination of the blocks in the block diagrams and/or flowcharts, may be implemented using a dedicated hardware-based system configured to perform specified functions or operations or may be implemented using a combination of dedicated hardware and computer instructions.

The modules or units described in the embodiments of the present disclosure may be embodied as software or hardware. Here, names of the modules or units do not constitute a limitation on the modules or units the under certain circumstances. For example, the second generation module can also be described as a "module configured to generate a second video based on the lyric information of the target music".

The functions described herein above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection having one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory device, a magnetic memory device, or any suitable combination thereof.

An embodiment of the present disclosure provides an electronic device. The electronic device according to this embodiment of the present disclosure can include a memory, a processor, and at least one application. The at least one application is stored in the memory and configured to be executed by the processor to achieve, compared with the related art: obtaining basic information of target music and lyric information of the target music, in response to a music poster generation instruction for the target music; generating a first video having a special effect based on the basic information of the target music; generating a second video based on the lyric information of the target music; and merging the first video with the second video to obtain the music poster of the target music. In this way, the music poster contains both the basic information of the target music and the lyric information of the target music, and a part containing the basic information of the target music has the special effect. Therefore, the music poster has visual appeal and the basic information of a song is highlighted at the same time, thereby enhancing the user's perception of the whole song and improving the user experience.

The above describes the electronic device of the present disclosure from the perspective of the physical device, and the following describes a computer-readable medium of the present disclosure from the perspective of a medium.

An embodiment of the present disclosure provides a computer-readable medium. The computer-readable medium stores a computer program. The computer program, when executed on a computer, causes the computer to perform corresponding contents in the above method embodiments. Compared with the prior art, the basic information of the target music and the lyric information of the target music are obtained in response to the music poster generation instruction for the target music; the first video having the special effect is generated based on the basic information of the target music, the second video is generated based on the lyric information of the target music; and the first video is merged with the second video to obtain the music poster of the target music. In this way, the music poster contains both the basic information of the target music and the lyric information of the target music, and a part containing the basic information of the target music has the special effect. Therefore, the music poster has visual appeal and the basic information of a song is highlighted at the same time, thereby enhancing the user's perception of the whole song and improving the user experience.

According to one or more embodiments of the present disclosure, a method for generating a music poster is provided. The method includes: obtaining basic information of target music and lyric information of the target music, in response to a music poster generation instruction for the target music; generating a first video having a special effect based on the basic information of the target music; generating a second video based on the lyric information of the target music; and merging the first video with the second video to obtain the music poster of the target music.

According to one or more embodiments of the present disclosure, said generating the first video having the special effect based on the basic information of the target music includes: applying a mask effect to a first poster background of the music poster to form an initial mask animation; and merging the basic information of the target music with the initial mask animation to obtain the first video having the special effect.

According to one or more embodiments of the present disclosure, said applying the mask effect to the first poster background of the music poster includes: applying the mask effect to the first poster background of the music poster in a pre-determined sticker sequence. The sticker sequence includes at least one sticker image.

According to one or more embodiments of the present disclosure, said applying the mask effect to the first poster background of the music poster in the pre-determined sticker sequence includes: when the first poster background is a picture, applying the mask effect to the first poster background by using each stick image in the sticker sequence; or when the first poster background is a video, selecting a first number of frame images from the video, where the first number is a number of sticker images in the sticker sequence, and applying the mask effect to the first number of frame images respectively by using the first number of sticker images in the sticker sequence.

According to one or more embodiments of the present disclosure, said merging the basic information of the target music with the initial mask animation includes: embedding the basic information of the target music in a display interface of the initial mask animation based on a predetermined display mode. The predetermined display mode includes at least one of a display mode of moving along a predetermined trajectory, a display mode of information scrolling, a display mode of a repeated arrangement, a display mode of Gaussian Blur, and a display mode with a dashed line.

According to one or more embodiments of the present disclosure, said embedding the basic information of the target music in the display interface of the initial mask animation includes: dividing the basic information of the target music into at least two pieces of song sub-information based on contents of the basic information; and embedding each of the at least two pieces of song sub-information in a predetermined position in the display interface of the initial mask animation.

According to one or more embodiments of the present disclosure, the basic information of the target music includes at least one of a singer's name, a song name, an album name, a lyricist, a composer, an arranger, a release date, a language type, a song genre, and a lyric keyword.

According to one or more embodiments of the present disclosure, said generating the second video based on the lyric information of the target music includes: merging the lyric information of the target music with a second poster background of the music poster to obtain the second video.

According to one or more embodiments of the present disclosure, an apparatus for generating a music poster is provided. The apparatus includes: an obtaining module configured to obtain basic information of target music and lyric information of the target music, in response to a music poster generation instruction for the target music; a first generation module configured to generate a first video having a special effect based on the basic information of the target music; a second generation module configured to generate a second video based on the lyric information of the target music; and a merging module configured to merge the first video with the second video to obtain the music poster of the target music.

According to one or more embodiments of the present disclosure, the first generation module is specifically configured to: apply a mask effect to a first poster background of the music poster to form an initial mask animation; and merge the basic information of the target music with the initial mask animation to obtain the first video having the special effect.

According to one or more embodiments of the present disclosure, when applying the mask effect to the first poster background of the music poster, the first generation module is specifically configured to apply the mask effect to the first poster background of the music poster in a pre-determined sticker sequence. The sticker sequence includes at least one sticker image.

According to one or more embodiments of the present disclosure, when applying the mask effect to the first poster background of the music poster in the pre-determined sticker sequence, the first generation module is specifically configured to: apply the mask effect to the first poster background by using each stick image in the sticker sequence when the first poster background is a picture; or select a first number of frame images from the video when the first poster background is a video, where the first number is a number of sticker images in the sticker sequence, and apply the mask effect to the first number of frame images respectively by using the first number of sticker images in the sticker sequence.

According to one or more embodiments of the present disclosure, when merging the basic information of the target music with the initial mask animation, the first generation module is specifically configured to embed the basic information of the target music in a display interface of the initial mask animation based on a predetermined display mode. The predetermined display mode includes at least one of a display mode of moving along a predetermined trajectory, a display mode of information scrolling, a display mode of a repeated arrangement, a display mode of Gaussian Blur, and a display mode with a dashed line.

According to one or more embodiments of the present disclosure, when embedding the basic information of the target music in the display interface of the initial mask animation, the first generation module is specifically configured to: divide the basic information of the target music into at least two pieces of song sub-information based on contents of the basic information; and embed each of the at least two pieces of song sub-information in a predetermined position in the display interface of the initial mask animation.

According to one or more embodiments of the present disclosure, the basic information of the target music includes at least one of a singer's name, a song name, an album name, a lyricist, a composer, an arranger, a release date, a language type, a song genre, and a lyric keyword.

According to one or more embodiments of the present disclosure, the second generation module is specifically configured to obtain the second video by merging the lyric information of the target music with a second poster background of the music poster.

According to one or more embodiments of the present disclosure, an electronic device is provided. The electronic device includes one or more processors, a memory, and one or more applications. The one or more applications are stored in the memory and configured to be executed by the one or more processors to perform the method for generating the music poster according to the embodiments involving method.

According to one or more embodiments of the present disclosure, a computer-readable medium is provided. The computer-readable medium stores a computer program. The computer program, when executed by a processor, performs the method for generating the music poster according to the embodiments involving method.

The above description is only intended to explain the preferred embodiments of the present disclosure and the employed principles of the technology. It will be appreciated by those skilled in the art that the scope of the present disclosure herein is not limited to t the technical solutions formed by the specific combination of the above technical features, but should also encompass any other combinations of features described above or equivalents thereof without departing from the above concept of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multitasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for generating a music poster, the method comprising:
    obtaining basic information of target music and lyric information of the target music, in response to a music poster generation instruction for the target music;
    generating a first video having an effect based on the basic information of the target music;
    generating a second video based on the lyric information of the target music; and
    putting the second video after the first video to obtain the music poster of the target music,
    wherein said generating the first video having the effect based on the basic information of the target music comprises:
    applying a mask effect to a first poster background of the music poster to form an initial mask animation; and
    merging the basic information of the target music with the initial mask animation to obtain the first video having the effect, wherein said merging the basic information of the target music with the initial mask animation comprises:

embedding the basic information of the target music in a display interface of the initial mask animation based on a predetermined display mode, and wherein said embedding the basic information of the target music in the display interface of the initial mask animation comprises:

dividing the basic information of the target music into at least two pieces of song sub-information based on contents of the basic information; and embedding each of the at least two pieces of song sub-information in a predetermined position in the display interface of the initial mask animation.

2. The method according to claim 1, wherein said applying the mask effect to the first poster background of the music poster comprises:

applying the mask effect to the first poster background of the music poster in a pre-determined sticker sequence, wherein the sticker sequence comprises at least one sticker image.

3. The method according to claim 2, wherein said applying the mask effect to the first poster background of the music poster in the pre-determined sticker sequence comprises:

when the first poster background is a picture, applying the mask effect to the first poster background by using each stick image in the sticker sequence;

when the first poster background is a video, selecting a first number of frame images from the video, wherein the first number is a number of sticker images in the sticker sequence; and applying the mask effect to the first number of frame images respectively by using the first number of sticker images in the sticker sequence.

4. The method according to claim 1, wherein the predetermined display mode comprises at least one of a display mode of moving along a predetermined trajectory, a display mode of information scrolling, a display mode of a repeated arrangement, a display mode of Gaussian Blur, and a display mode with a dashed line.

5. The method according to claim 1, wherein the basic information of the target music comprises at least one of a singer's name, a song name, an album name, a lyricist, a composer, an arranger, a release date, a language type, a song genre, and a lyric keyword.

6. The method according to claim 1, wherein said generating the second video based on the lyric information of the target music comprises:

obtaining the second video by merging the lyric information of the target music with a second poster background of the music poster.

7. An electronic device, comprising:

one or more processors;

a memory; and one or more applications, wherein the one or more applications are stored in the memory and configured to be executed by the one or more processors to perform the method for generating the music poster according to claim 1.

8. A computer-readable medium having a computer program stored thereon, wherein the computer program, when executed by a processor, performs the method for generating the music poster according to claim 1.

* * * * *